Sept. 22, 1964  R. BREUNING  3,149,400
TOOL ARRANGEMENT
Filed Dec. 17, 1958  2 Sheets-Sheet 1
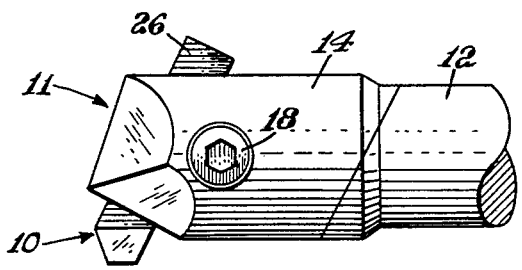
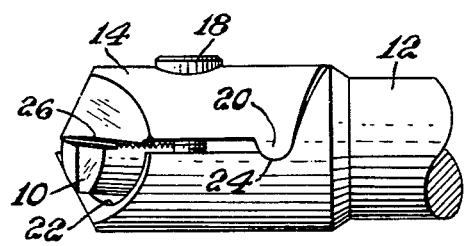
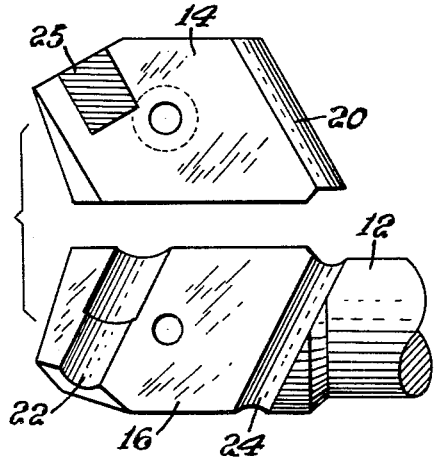
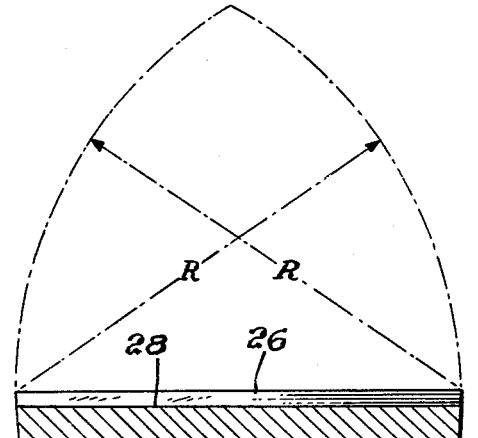
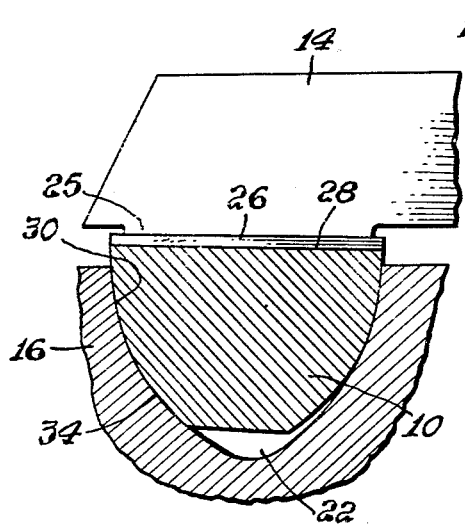
INVENTOR.
Robert Breuning
BY Sept. 22, 1964 R. BREUNING 3,149,400
TOOL ARRANGEMENT
Filed Dec. 17, 1958 2 Sheets-Sheet 2
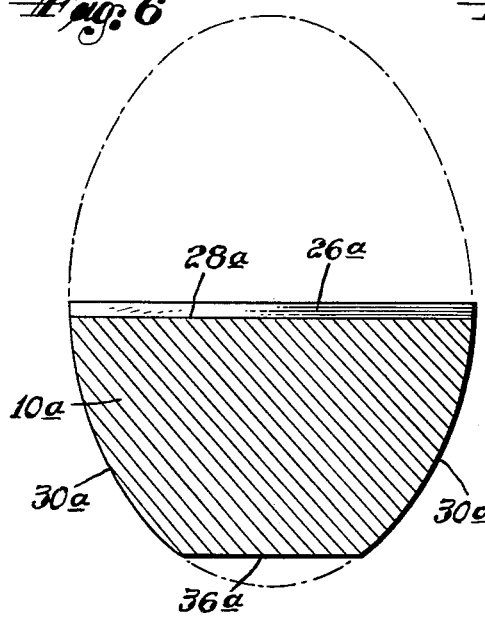
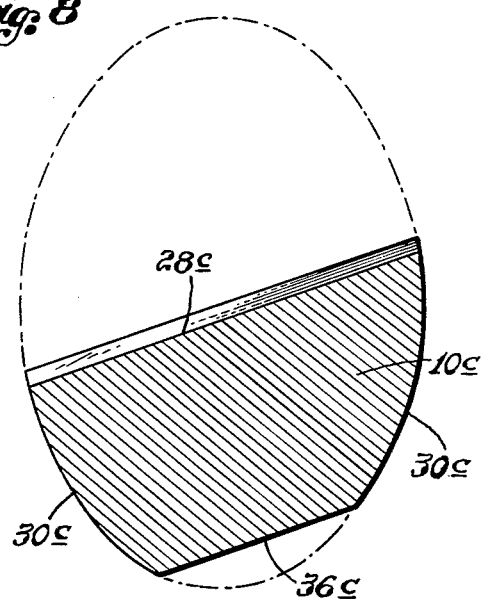
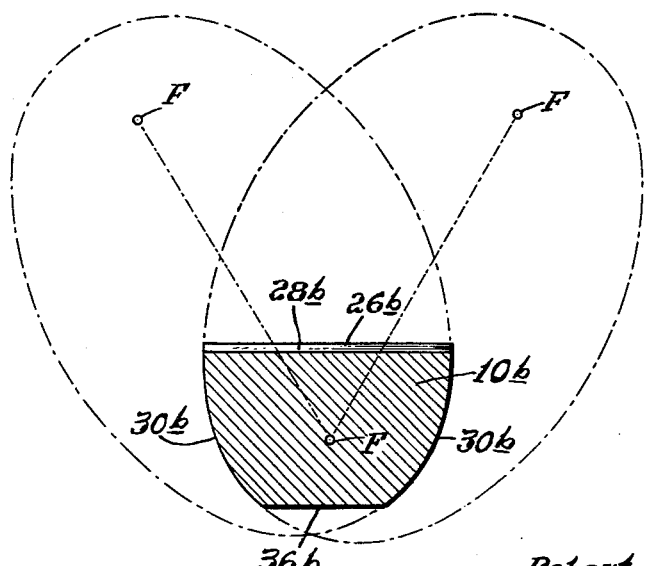
INVENTOR.
Robert Breuning
BY

United States Patent Office 3,149,400
Patented Sept. 22, 1964

3,149,400
TOOL ARRANGEMENT
Robert Breuning, Besigheim, Wurttemberg, Germany
Filed Dec. 17, 1958, Ser. No. 781,011
Claims priority, application Germany July 13, 1953
6 Claims. (Cl. 29—96)

This invention relates to tool arrangements for machining a workpiece, and more particularly to arrangements in which a tool bit is held in a conforming tool holder during such machining.

In its more specific aspects, the invention relates to lathe tool bits for the cutting of metals, tool bits which are made from very hard materials relatively difficult to shape, such as certain grades of tool steel, and sintered tool bits having particles of extremely hard substances, such as metal carbides embedded in a metallic matrix material.

When such tool bits are held in a tool holder during the machining operation, it is essential in order to ensure long tool bit life that the tool bit be seated in the holder firmly so as to prevent relative movement of tool bit and tool holder during the working of a workpiece.

Thus, it is the primary object of the present invention to provide a tool bit and a tool arrangement which prevents relative movement of tool bit and tool holder during the working of a workpiece.

Another object is the provision of a tool bit capable of being firmly seated in a conforming tool holder.

Yet another object is the provision of a tool bit which is rotatably adjustable in the tool holder to compensate for deviations from conformity.

A further object of the invention is the provision of a tool bit which is held in its rotatably adjusted position not only by fastening means specifically provided for but also by the working pressure exerted by the workpiece on the tool bit during the machining operation.

An additional object is to provide a tool arrangement in which the tool bit is secured against rotation in the adjusted position.

Another object is the provision of a tool arrangement that requires little or no corrective operations to fit a tool bit into a receiving recess of a tool holder.

It is an important object of the invention to provide a tool arrangement in which the contact between the tool bit and holder is substantially an area contact rather than a line or point contact.

A still further object of my invention is to provide a tool bit of the referred to type, which is integrally formed with a lip angle and does not require that such an angle be ground.

With these and other objects in view, the invention contemplates a tool bit for use with conforming tool holder means and attachable thereto for machining a workpiece. The tool bit has a top face extending transversely to and substantially facing the direction of machining, when the tool bit is attached to the holder means and the machining is done. The cutting edge may be ground along the top face. The tool bit has further outwardly curved side faces which extend from the top face toward the bottom of the tool bit and form convex surfaces to engage conforming concave wedging surfaces of a tool holder associated with the tool bit. At least portions of the side faces curve toward each other in a direction away from the top so that these side face portions form a wedge having curved wedging faces. It is at the bottom end of the tool bit that the side face portions approach each other. The curvature of at least the side face portions is such that the center of curvature of each of the side face portions is in a plane perpendicular to a median plane of the tool, extending between the side faces. Further, each center is located beyond said median plane, when viewed from the respective side face portion. Thus, each element of the side face portions has a radius of curvature that is greater than the radius of a tangential circle having its center in the median plane, and intersects a plane which is perpendicular to the median plane.

Such configuration of the side faces permits a certain amount of rotation of the tool bit in a substantially conforming tool holder to establish the best seating position in which there is maximum areal contact between the tool bit and the holder. In this position, the tool bit is secured against accidental rotation. The pressure during working urges the tool bit toward the tool holder and fixes the adjusted position by wedging the converging side face portions of the tool bit between conforming side walls of a recess in the holder, in which recess the tool bit is received.

In a preferred embodiment of the invention, at least one of the side faces of the tool bit encloses with the top face an angle slightly smaller than a right angle, the difference being approximately 6° and constituting the lip angle of the tool bit.

The curvature of the side faces of the tool bit, and at least the curvature of converging portions thereof, is preferably elliptic to permit a small amount of rotation of the tool bit within the receiving recess of the tool holder to take up the unavoidable play between tool bit and holder. It has also been found that a favorable compromise between rotatable adjustability and firm seating so as to avoid movement of the tool bit in the tool holder is achieved when the radius of curvature of the side faces of the tool bit, and the side walls of the holder recess, is approximately equal to the greatest width between the curves defining said side faces and side walls, with the tool bit and tool holder viewed in cross section. The two axes are then of approximately equal length, so that the side faces and side walls are of fragmentary cylindrical shape.

While the two side faces of the tool bit of the invention are preferably symmetrical relative to the median plane of the tool bit, and are joined by parallel top and bottom faces, different arrangements are within the scope of this invention.

Other objects and features of the invention will become apparent from the following detailed description.

The specification is accompanied by drawings in which:

FIG. 1 is a plan view of a tool holder holding a tool bit according to the invention;

FIG. 2 is an elevation of the tool holder and tool bit of FIG. 1;

FIG. 3 shows the tool holder of FIG. 1 in disassembled condition;

FIG. 4 is a section taken in elevation through a tool bit of the invention, drawn to a larger scale;

FIG. 5 is a partially sectioned elevation of the tool bit of FIG. 4 seated in a tool holder; and FIGS. 6 to 8 are sections taken in elevation through three embodiments of the tool of my invention, also drawn to an enlarged scale.

Referring to the drawings in detail, and initially to FIGS. 1–5, there is shown a cutting tool bit 10 mounted in the head portion 11 of a cylindrical tool holder 12. The head portion of the tool holder is split across a substantially axial plane, and the split-off or removable part 14 constitutes a clamping member which can be fastened to the fixed part 16 of the tool holder head by a clamping screw 18. The portion 14 is pivotable on the portion 16 through a small arc about a projecting ridge 20.

The fixed part 16 of the tool holder head has an obliquely extending transverse groove or recess 22 for receiving the tool bit, the groove being parallel to a groove 24 which receives the ridge 20. At least a portion of the groove 22 is shaped to conform to the side faces of the tool bit 10, as will presently be discussed in greater detail. A portion of the face of the clamping member 14, overlying the conforming portion of the groove 22, is formed with corrugations 25 for engagement with corresponding corrugations 26 on the tool bit 10.

The tool bit of FIG. 2 is shown in FIG. 4 on an enlarged scale. It has a flat top face 28 provided with corrugations 26 and extending perpendicularly to the median plane of symmetry of the tool bit. The side faces 30 extend between the top face 28 and a flat bottom face 32 which is parallel to the top face 28. The radius of curvature R of the side faces 30 is equal to the width of the tool bit at the level of the corrugations 26, that is, the greatest width between the two circular arcs defined by side faces 30.

The cutting edge is ground into the top face 28 below the level of the corrugations 26 so that the plane tangential to a side face at its juncture with the top face 28 forms with the latter a lip angle which is preferably of the order of 6°.

FIG. 5 illustrates the cooperation of the tool bit of FIG. 4, when oversized, with a tool holder which due to the oversized tool bit lacks in complete conformity. As can be seen, the recess 22 in the tool holder part 16 is somewhat too narrow to permit full engagement of the tool bit 10. Such a condition may easily present itself when, for instance, the tool bit is made of sintered cemented carbide material which may slightly expand in the sintering operation.

While a conventional tool bit has to be ground to proper shape, a relatively difficult, time-consuming, and costly operation being required in the case of a carbide tool bit, an entirely adequate seating is ensured with the tool arrangement of the invention. The tool bit 10 may be rotated slightly in the recess 22, about the longitudinal axis of the recess, so that at least one of the side faces 30 will be in substantially complete areal contact with the corresponding side wall 34 of the recess 22, and the opposite side face makes a partial areal contact. Since the removable clamping member 14 is pivotable through a small arc about the projecting ridge 20, the tool bit 10 may be firmly clamped against the fixed part 16 of the tool holder 12 although the tool bit does not completely conform to the recess of the tool holder. It is evident that an undersize tool bit may similarly be accommodated in a holder recess and secured therein by rotational adjustment. Such adjustability is due to the radius R being greater than one-half of the width of the tool bit so that the center of curvature of each of the side faces is located beyond the median plane of tool bit 10.

While the tool bit illustrated in FIGS. 4 and 5 and the corresponding tool holder recess are bounded by side faces and side walls, respectively, which are parts of cylinders, the essential objects of the invention may also be achieved with elliptically curved surfaces, a few examples of which are illustrated in FIGS. 6 to 8.

The embodiment of FIG. 6 differs from that of FIG. 4 in that the side faces 30a define an ellipse, when viewed in cross section, and constitute symmetrical portions of the same ellipse having its short axis in the plane of the corrugations 26a. The top face 28a and the bottom face 36a of the tool bit intersect the plane of symmetry of the tool bit at right angles.

The tool bit shown in FIG. 7 is similar in many respects to the embodiment of FIG. 6, but the elliptic arcs which represent the cross sections of side faces 30b are portions of two identical ellipses having one focus F in common and the long axes of which enclose an angle of 60°.

The choice of any particular cross sectional configuration is governed by considerations of performance as well as equipment available for producing the tool bits and forming the mating recesses in the tool holder. Tool bit faces and tool holder recesses bounded by elliptically or cylindrically curved surfaces are more readily produced than others having more complex arcuate shapes. Tool bits and holders, with elliptical or cylindrical side faces and side walls, respectively, have also been found to have substantially longer life than tool bits and tool holders making contact by mating flat side surfaces.

FIG. 8 illustrates an asymmetrical tool bit of the invention, such as may be required for special cutting operations. The side faces 30c of the tool bit 10c, in cross section, are arcs of the same ellipse, but they are not symmetrically arranged about the long axis of the ellipse. The top face 28c and the bottom face 36c, while parallel, do not extend parallel to the short axis of the ellipse.

It will be understood that the variously shaped side faces of the tool bit of the invention are to be used in conjunction with tool holders having correspondingly shaped recesses for receiving the tool bit. Such recesses may embrace both side faces and the bottom face of the tool, but it will be understood to be entirely within the scope of this invention to provide a tool holder conforming over the side faces only, or over limited areas of the side faces or one side face so as to provide conforming support for the tool bit. While none of the embodiments of the invention, as shown, provides for contact between the bottom face of the tool bit and the bottom wall of the recess in the tool holder, and while it is preferred to space the bottom face and the bottom wall from each other, such spacing is not necessarily required for achieving some of the objects of this invention.

The projecting ridge 20 and the matingly shaped groove 24, shown in FIGS. 2 and 3, are an important feature of the invention. It will be apparent that a protruding part, such as the ridge 20, may be provided on the tool holder as well, rather than the clamping member, with the receiving part, such as the groove 24, being then provided in the clamping member instead of the tool holder. It will also be understood that the complementary pivoting means may be of various designs.

Many modifications are contemplated and may obviously be resorted to by those skilled in the art without departing from the spirit and scope of the invention, as hereinafter defined by the appended claims.

This application is a continuation-in-part of my copending application Serial No. 443,100, filed on July 13, 1954, now abandoned.

I claim:

1. A tool arrangement comprising a tool bit having a top face and outwardly curving side faces, respective portions of said side faces converging toward each other in a direction away from said top face, said tool bit having a median plane between said side faces, the radius of curvature of each element of said side face portions being greater than the spacing of said element from said median plane along said radius of curvature thereof; tool holder means formed with a recess having a side wall, said tool bit being received in said recess, and a portion of said side wall substantially conforming to one of said side face portions of said tool bit; and fastening means on said tool holder means for fastening said tool bit to said tool holder means by urging said one side face portion into abutting engagement with said side wall portion.

2. A tool arrangement as set forth in claim 1, wherein said fastening means is pivotally mounted on said tool holder means.

3. A tool arrangement according to claim 1, wherein said side face portions are substantially elliptically curved.

4. A tool arrangement according to claim 1, wherein said side faces are symmetrical relative to said median plane.

5. A tool arrangement according to claim 1, wherein said side faces are elliptically curved and have a common ellipse of curvature.

6. A tool arrangement according to claim 3, wherein the top face and one of the side faces define an angle slightly smaller than a right angle, the difference between the smaller and a right angle constituting the lip angle of the tool bit.

References Cited in the file of this patent

UNITED STATES PATENTS

| | | | |
|---|---|---|---|
| 902,169 | Richards | Oct. 27, | 1908 |
| 973,052 | Lang | Oct. 18, | 1910 |
| 992,860 | Dette | May 23, | 1911 |
| 1,219,097 | Gibbs | Mar. 13, | 1917 |
| 1,242,707 | Lovejoy | Oct. 9, | 1917 |
| 1,255,620 | Lovejoy | Feb. 5, | 1918 |
| 1,256,359 | Oberg | Feb. 12, | 1918 |
| 1,387,339 | Banister | Aug. 9, | 1921 |
| 1,397,357 | Bronander | Nov. 15, | 1921 |
| 1,406,265 | Lawson | Feb. 14, | 1922 |
| 1,776,335 | Rauzieres | Sept. 23, | 1930 |
| 2,310,992 | Proksa | Feb. 16, | 1943 |
| 2,849,787 | Hertel | Sept. 2, | 1958 |
| 2,860,402 | Proksa | Nov. 18, | 1958 |

FOREIGN PATENTS

| | | | |
|---|---|---|---|
| 1,102,292 | France | May 4, | 1955 |